US009567428B2

(12) United States Patent
Yoo et al.

(10) Patent No.: US 9,567,428 B2
(45) Date of Patent: *Feb. 14, 2017

(54) POLYLACTIC ACID RESIN COMPOSITION AND A PACKAGING FILM

(76) Inventors: Young-Man Yoo, Seoul (KR);
Tae-Woong Lee, Gyeonggi-do (KR);
Kye-Yune Lee, Gyeonggi-do (KR);
Jae-Il Chung, Gyeonggi-do (KR)

( * ) Notice: Subject to any disclaimer, the term of this patent is extended or adjusted under 35 U.S.C. 154(b) by 682 days.

This patent is subject to a terminal disclaimer.

(21) Appl. No.: 13/993,763

(22) PCT Filed: Nov. 2, 2011

(86) PCT No.: PCT/KR2011/008309
§ 371 (c)(1),
(2), (4) Date: Aug. 21, 2013

(87) PCT Pub. No.: WO2012/081827
PCT Pub. Date: Jun. 21, 2012

(65) Prior Publication Data
US 2014/0302297 A1 Oct. 9, 2014

(30) Foreign Application Priority Data

Dec. 17, 2010 (KR) ........................ 10-2010-0130224

(51) Int. Cl.
B32B 7/02 (2006.01)
A61F 13/15 (2006.01)
B32B 27/32 (2006.01)
C08G 63/664 (2006.01)
C08J 5/18 (2006.01)
C08G 63/08 (2006.01)
C08L 67/04 (2006.01)
C08G 18/48 (2006.01)
C08G 18/73 (2006.01)
C08G 18/80 (2006.01)
C08G 18/40 (2006.01)
C08G 18/42 (2006.01)

(52) U.S. Cl.
CPC ......... *C08G 63/664* (2013.01); *C08G 18/4018* (2013.01); *C08G 18/4202* (2013.01); *C08G 18/428* (2013.01); *C08G 18/4854* (2013.01); *C08G 18/73* (2013.01); *C08G 18/8029* (2013.01); *C08G 63/08* (2013.01); *C08J 5/18* (2013.01); *C08L 67/04* (2013.01); *C08J 2367/04* (2013.01)

(58) Field of Classification Search
CPC ............ C08G 18/4018; C08G 18/4202; C08G 18/428; C08G 18/4854; C08G 18/73; C08G 18/8029; C08G 63/08; C08G 63/664; C08J 5/18; C08J 2367/04; C08L 67/04; Y10T 428/31786
USPC ................................................ 428/212–220
See application file for complete search history.

(56) References Cited

U.S. PATENT DOCUMENTS

| 4,826,945 | A |   | 5/1989 | Cohn et al. |
| 6,114,495 | A | * | 9/2000 | Kolstad ................ C08G 63/90 525/413 |
| 6,117,949 | A |   | 9/2000 | Rathi et al. |
| 2006/0034888 | A1 |   | 2/2006 | Pacetti et al. |
| 2009/0203852 | A1 | * | 8/2009 | Urakami ................ C08L 67/04 525/418 |
| 2010/0151219 | A1 | * | 6/2010 | Busch ..................... B29C 55/16 428/220 |

FOREIGN PATENT DOCUMENTS

| CN | 1225014 | 8/1999 |
| CN | 1621433 | 6/2005 |
| CN | 101381468 | 3/2009 |
| CN | 101899139 | 12/2010 |
| CN | 102432802 | 5/2012 |
| EP | 2045293 | 4/2009 |
| JP | 63-278924 | 11/1988 |
| JP | 08-027256 | 1/1996 |
| JP | 09-003150 | 1/1997 |
| JP | 10-101778 A1 * | 4/1998 |
| JP | H10-101778 | 4/1998 |
| JP | 2004-204068 | 7/2004 |
| JP | 2005-008897 | 1/2005 |
| KR | 10-2009-0118938 | 11/2009 |
| KR | 10-2010-0098529 | 9/2010 |
| WO | WO 2007/094352 | 8/2007 |
| WO | WO 2010-053065 A1 | 5/2010 |
| WO | WO 2010-053167 A1 | 5/2010 |

OTHER PUBLICATIONS

Zeng et al. ("A novel biodegradable multiblock poly(ester urethane) containing poly(L-lactic acid) and poly(butylene succinate) blocks" Polymer, 2009, 50, p. 1178-1186).*
JP 10-101778 A1 Machine Translation.*
International Search Report prepared by the Korean Intellectual Property Office on Jun. 5, 2012, for International Application No. PCT/KR2011/008309.
Fan et al., "Study on chain extention and modivication of homopolymer poly(lactic acid) via two steps with IPDI/PEG," Modern Chemical Industry, Nov. 2008, pp. 52-54 (with English abstract).
Official Action for Chinese Patent Application No. 201180060604, dated Apr. 15, 2014, 6 pages (No English translation available).

* cited by examiner

*Primary Examiner* — Maria Veronica Ewald
*Assistant Examiner* — Travis Figg

(57) ABSTRACT

The present invention relates to a polylactic acid resin composition useful as a packaging material which has not only improved flexibility but also superior external appearance and superior properties such as mechanical property, transparency, heat resistance, anti-blocking property, workability of a film, and the like, and a packaging film including the same.
The polylactic acid resin composition comprises a polylactic acid resin including a hard segment comprising a polylactic acid repeating unit and a soft segment comprising a polyurethane polyol repeating unit in which polyether polyol repeating units are linearly linked via a urethane bond; and a specific content of antioxidant.

15 Claims, No Drawings

POLYLACTIC ACID RESIN COMPOSITION AND A PACKAGING FILM

CROSS REFERENCE TO RELATED APPLICATIONS

This application is a national stage application under 35 U.S.C. 371 and claims the benefit of PCT Application No. PCT/KR2011/008309 having an international filing date of 02 Nov. 2011, which designated the United States, and which PCT application claimed the benefit of Korean Patent Application No. 10-2010-0130224 filed 17 Dec. 2010, the disclosure of each of which is incorporated herein by reference.

TECHNICAL FIELD

The present invention relates to a polylactic acid resin composition and a packaging film. More particularly, the present invention relates to a polylactic acid resin composition useful as a packaging material which has not only improved flexibility but also superior external appearance and superior properties such as mechanical property, transparency, heat resistance, anti-blocking property, workability of a film, and the like, and a packaging film including the same.

This application claims the benefit of Korean Patent Application No. 10-2010-0130224 filed on Dec. 17, 2010, the disclosures of all of which are hereby incorporated by reference in its entirety into this application.

BACKGROUND OF THE ART

Most conventional polymers derived from petroleum resources such as polyethylene terephthalate (PET), nylon, polyolefin and polyvinyl chloride (PVC) resins, have been used for materials for a wide range of applications such as packaging materials. However, these polymers are resistant to biodegradation and related to environmental issues like carbon dioxide gas, which causes the global warming on the waste treatment processes. In addition, there have been wide studies on the use of biomass-based resins including polylactic acid following the depletion of petroleum resources.

However, as polylactic acid derived from plants is lower in mechanical properties and the like than petroleum-based resins, there have been limitations of the fields and applications to which it is applicable. Particularly, attempts have been made to use polylactic acid resins as packaging materials such as packaging films, but they have failed due to the poor flexibility of polylactic acid resins.

In order to overcome the problems of polylactic acid resins, it has been suggested that low-molecular weight flexibilizers or plasticizers be added to polylactic acid resins, or plasticizers produced by addition polymerization of polyether-based or aliphatic polyester-based polyol be applied to the polylactic acid resins.

However, there is little improvement of flexibility in most of the packaging films comprising polylactic acid resins which are produced according to these methods. Furthermore, the packaging films exhibit poor stability as the plasticizers bleed out over time, and have the disadvantages of an increase in haze together with a decrease in low transparency. In most cases of conventional methods, the plasticizer caused a decrease in mechanical properties of the packaging film, and particularly, the polylactic acid resins which can be easily processed by an extrusion and the like with superior mechanical properties have hardly been suggested. In addition, many cases of adding the plasticizer caused a yellowing of polylactic acid resin and deteriorated the external appearance of the packaging film.

Accordingly, there is a continuous demand for a polylactic acid resin film that has improved flexibility and superior external appearance, and exhibits excellent properties including mechanical property, transparency, heat resistance, anti-blocking property, workability of a film, and the like.

DETAILED DESCRIPTION OF THE INVENTION

Technical Objectives

It is therefore an object to provide a polylactic acid resin composition useful as a packaging material which exhibits favorable external appearance and superior properties such as mechanical property, transparency, heat resistance, anti-blocking property, workability of a film, and the like as well as optimized flexibility.

It is another object of the present invention to provide a packaging film comprising the polylactic acid resin composition.

Technical Solutions

The present invention provides a polylactic acid resin composition, comprising:

a polylactic acid resin including a hard segment comprising a polylactic acid repeating unit of the following Chemical Formula 1, and a soft segment comprising a polyurethane polyol repeating unit in which polyether polyol repeating units of the following Chemical Formula 2 are linearly linked via a urethane bond; and an antioxidant of 100 to 1500 ppmw per the amount of the monomers for forming the polylactic acid repeating unit:

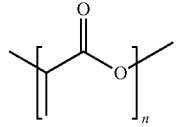

[Chemical Formula 1]

[Chemical Formula 2]

wherein A is a linear or branched alkylene of 2 to 5 carbon atoms, m is an integer of 10 to 100, and n is an integer of 700 to 5000.

The present invention also provides a packaging film including the polylactic acid resin composition.

Hereinafter, a polylactic acid resin composition and a packaging film comprising the same according to specific embodiments will be explained in detail.

According to one embodiment of the invention, a polylactic acid resin composition, comprising a polylactic acid resin including a hard segment comprising a polylactic acid repeating unit of the following Chemical Formula 1, and a soft segment comprising a polyurethane polyol repeating unit in which polyether polyol repeating units of the following Chemical Formula 2 are linearly linked via a urethane bond; and an antioxidant of 100 to 1500 ppmw per the amount of the monomers for forming the polylactic acid repeating unit is provided:

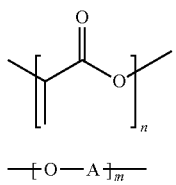

[Chemical Formula 1]

—{O—A}ₘ—   [Chemical Formula 2]

wherein A is a linear or branched alkylene of 2 to 5 carbon atoms, m is an integer of 10 to 100, and n is an integer of 700 to 5000.

Such polylactic acid resin composition includes a prescribed polylactic acid resin and a specific amount of antioxidant, and the polylactic acid resin comprises a polylactic acid repeating units represented by Chemical Formula 1 basically as a hard segment. And, the polylactic acid comprises a polyurethane polyol repeating unit as a soft segment in which polyether polyol repeating units of Chemical Formula 2 are linearly linked via a urethane bond (—C(=O)—NH—).

The polylactic acid resin has biodegradability which is characteristic of biomass-based resins, as comprising the polylactic acid repeating units as a hard segment. In addition, according to experiment data obtained by the present inventors, it is suggested that the polylactic acid resin appeared improved flexibility (e.g., a relatively low total Young's modulus measured in machine direction and transverse direction), and allowed the production of a film with high transparency and low haze by comprising the polyurethane polyol repeating units as a soft segment.

In addition, the present inventors revealed that it was possible to suppress a yellowing of said polylactic acid resin, and a resin composition and a film having superior external appearance could be obtained by providing a polylactic acid resin composition including a certain amount of the antioxidant in company with said polylactic acid resin, and completed the present invention. Therefore, the resin composition of one embodiment of the present invention may include an antioxidant of about 100 to 1500 ppmw, preferably about 500 to 1500 ppmw, and more preferably about 1000 to 1500 ppmw, per the amount of the monomers (for example, lactic acid or lactide) for forming the polylactic acid repeating unit of said polylactic acid resin. If the content of the antioxidant is too low, a yellowing of the polylactic acid resin may be caused by the oxidation of the flexible components like said soft segments, and the external appearance of the resin composition and the film may be poor. On the other hand, if the content of the antioxidant is too high, the antioxidant may lessen the rate of polymerization of lactide, and thus the hard segment including said polylactic acid repeating unit may not be formed properly and the mechanical properties of the polylactic acid resin may be deteriorated.

In contrast, in the case of using the resin composition of one embodiment of the present invention including the antioxidant with the optimized content, more specifically, in the case of obtaining the polylactic acid resin and the resin composition of one embodiment by adding the antioxidant with the optimized content during the polymerization of the polylactic acid resin, the conversion of polymerization and the degree of polymerization of the polylactic acid resin can be increased and it is possible to increase the productivity. Furthermore, since the resin composition can exhibit superior heat stability in the film forming process over 180° C., it is possible to suppress the formation of monomers such as lactide or lactic acid, or low molecular weight materials such as cyclic oligomer chain. Therefore, it becomes possible to provide a packaging film which has not only superior external appearance but also improved flexibility and superior general properties such as mechanical property, heat resistance, anti-blocking property, and the like, as a result of suppressing a decrease in the molecular weight and the color change (yellowing) of the film.

Meanwhile, in the polylactic acid resin composition of said one embodiment, the polylactic acid repeating unit of Chemical Formula 1 included in the hard segment of the polylactic acid resin may refer to a polylactic acid homopolymer or a repeating unit of the homopolymer. This polylactic acid repeating unit may be obtained according to a typical method for preparing a polylactic acid homopolymer. For example, it can be obtained by the method of forming an L- or D-lactide, a cyclic diester of lactic acid, from L- or D-lactic acid and carrying out a ring-opening polymerization of the same, or by the method of direct polycondensation of L- or D-lactic acid. Among them, the ring-opening polymerization method is preferable because it can give the polylactic acid repeating unit having higher degree of polymerization. In addition, the polylactic acid repeating unit may be prepared by copolymerizing L-lactide and D-lactide at such a certain ratio so as to make the copolymer non-crystalline, but the polylactic acid repeating unit is preferably prepared by homopolymerization of either L-lactide or D-lactide in order to increase the heat resistance of the film comprising the polylactic acid resin. More specifically, an L- or D-lactide material with optical purity of about 98% or higher may be subjected to ring-opening polymerization to give the polylactic acid repeating unit. Lower optical purity might decrease the melting temperature (Tm) of the polylactic acid resin.

Also, the polyurethane polyol repeating unit included in the soft segment of the polylactic acid resin has a structure in which the polyether polyol repeating units of Chemical Formula 2 are linearly linked via a urethane bond (—C(=O)—NH—). More specifically, the polyether polyol repeating unit refers to a polymer prepared from a monomer such as alkylene oxide by ring-opening (co)polymerization, or a repeating unit of the polymer, and it may have a hydroxyl group at its end. This terminal hydroxyl group may be reacted with a diisocyanate compound to form a urethane bond (—C(=O)—NH—) and thus the polyether polyol repeating units are linearly linked to each other to afford the polyurethane polyol repeating unit. By including such polyurethane polyol repeating unit as a soft segment, the flexibility of the film including the polylactic acid resin can be improved largely. In addition, the polyurethane polyol repeating unit makes it possible to provide the film having excellent properties without deteriorating heat resistance, anti-blocking property, mechanical properties, or transparency of the polylactic acid resin or the film including the same.

On the other hand, polylactic acid copolymers comprising a soft segment in which polyester polyol repeating units are linked via a urethane bond, or a resin composition or a film including the same have been already known. However, there are some problems that the film including the polylactic acid copolymer has low transparency and high haze due to low compatibility between polyester polyol and polylactic acid. Furthermore, the condition of film extrusion is not good because such polylactic acid copolymers has wide molecular weight distribution and poor melting characteristics, and thus the film produced has insufficient mechanical properties, heat resistance, and anti-blocking property.

In addition, it has already been known that polylactic acid copolymers in which tri- or higher functional isocyanate compounds are used to copolymerize polyether polyol repeating units with polylactic acid repeating units in a branch pattern, or polylactic acid copolymers in which a copolymer of polyether polyol repeating units and polylactic acid repeating units is extended by a urethane reaction. But, they also have problems that heat resistance, mechanical properties, and anti-blocking property of the film are not sufficient, because the block size of the polylactic acid repeating unit corresponding to the hard segment is also small and the condition of film extrusion is not good due to wide molecular weight distribution and poor melting characteristics of the polylactic acid copolymer.

In contrast, since the polylactic acid resin comprising a polylactic acid repeating unit and a polyurethane polyol repeating unit in which multiple polyether polyol repeating units are linearly linked via a urethane bond, and the resin composition including the same have high molecular weight and narrow molecular weight distribution, it can provide the film having excellent mechanical properties, heat resistance, and anti-blocking property, and so on as well as excellent flexibility due to the polyurethane polyol repeating unit. Accordingly, the polylactic acid resin and the resin composition including the same according to one embodiment of the present invention are found to overcome the problems that the previous copolymers retain, and can be produced into films which exhibit excellent properties and greatly improved flexibility.

The polyether polyol repeating unit and the diisocyanate compound may be reacted with each other at a molar ratio of about 1:0.50 to 1:0.99 for the terminal hydroxyl group of the polyether polyol repeating unit:the isocyanate group of diisocyanate compound to form the polyurethane polyol repeating unit. The reaction molar ratio of the terminal hydroxyl of the polyether polyol repeating unit and the isocyanate group of diisocyanate compound may preferably range from about 1:0.60 to 1:0.90, and more preferably from about 1:0.70 to 1:0.85.

As will be explained below, the polyurethane polyol repeating unit refers to a polymer in which the polyether polyol repeating units are linearly linked via a urethane bond, or a repeating unit of the polymer, and may have a hydroxyl group at its terminal. Accordingly, the polyurethane polyol repeating unit may act as an initiator for the formation of the polylactic acid repeating unit in the polymerization process. When the molar ratio of the terminal hydroxyl group:isocyanate group exceeds about 0.99, the number of terminal hydroxyl groups of the polyurethane polyol repeating unit is so insufficient (OHV<3) that the polyurethane polyol repeating unit cannot suitably act as an initiator. On the other hand, when the molar ratio of the hydroxyl group: the isocyanate group is too low, the terminal hydroxyl group of the polyurethane polyol repeating unit becomes too abundant (OHV>21) to obtain polylactic acid repeating units and polylactic acid resins with high-molecular weight.

Meanwhile, the polyether polyol repeating unit may be a polyether polyol (co)polymer prepared by a ring-opening (co)polymerization of one or more alkylene oxide monomers, or a repeating unit thereof, for example. Examples of the alkylene oxide monomers include ethylene oxide, propylene oxide, butylene oxide and tetrahydrofuran. The polyether polyol repeating unit prepared from the monomers may be exemplified by a repeating unit of polyethylene glycol (PEG); a repeating unit of poly(1,2-propylene glycol); a repeating unit of poly(1,3-propanediol); a repeating unit of polytetramethylene glycol; a repeating unit of polybutylene glycol; a repeating unit of a polyol copolymerized from propylene oxide and tetrahydrofuran; a repeating unit of a polyol copolymerized from ethylene oxide and tetrahydrofuran; and a repeating unit of a polyol copolymerized from ethylene oxide and propylene oxide. Considering the ability to endow the polylactic acid resin film with flexibility, affinity to the polylactic acid repeating unit, and water content property, a repeating unit of poly(1,3-propanediol) or polytetramethylene glycol may be preferably used as the polyether polyol.

In addition, the polyether polyol repeating unit may have a number average molecular weight of about 450 to 9000, and preferably about 1000 to 3000. If the molecular weight of the polyether polyol repeating unit is excessively high or low, flexibility or mechanical properties of the film obtained from the polylactic acid resin and the resin composition of one embodiment may be insufficient. Furthermore, productivity of the resin composition may decline, or flexibility or mechanical properties of the film may decline.

And, the diisocyanate compound may be any compound which has two isocyanate groups, so long as it can form a urethane bond with the terminal hydroxyl group of the polyether polyol repeating unit. Examples of the diisocyanate compounds include 1,6-hexamethylene diisocyanate, 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-bisphenylene diisocyanate, hexamethylene diisocyanate, isophorone diisocyanate, and hydrogenated diphenylmethane diisocyanate. In addition, various other diisocyanate compounds well known to those who skilled in the art may be used without particular limitations. Considering the ability to endow the polylactic acid resin with flexibility, 1,6-hexamethylene diisocyanate is preferred.

Meanwhile, the polylactic acid resin included in the resin composition of one embodiment may comprise a block copolymer in which said polylactic acid repeating units, the hard segment, are copolymerized with said polyurethane polyol repeating units, the soft segment. More specifically, the terminal carboxyl group of the polylactic acid repeating unit can be linked to the terminal hydroxyl group of the polyurethane polyol repeating unit via an ester bond in the block copolymer. For example, the chemical structure of the block copolymer may be represented by the following General Formula 1:

Polylactic acid repeating unit (L)-Ester-Polyurethane polyol repeating unit (E-U-E-U-E)-Ester-Polylactic acid repeating unit (L)     [General Formula 1]

wherein, E is a polyether polyol repeating unit, U is a urethane bond, and Ester is an ester bond.

As the resin comprises a block copolymer in which the polylactic acid repeating unit and the polyurethane polyol repeating unit are copolymerized, the film produced therefrom can have excellent transparency, mechanical properties, heat resistance or anti-blocking property while suppressing the bleed-out of the polyurethane polyol repeating unit for giving flexibility. Furthermore, as at least some of polylactic acid repeating unit and the polyurethane polyol repeating unit form a block-copolymer, molecular weight distribution, glass transition temperature (Tg), and melting temperature (Tm) of the polylactic acid resin can be optimized and mechanical properties, flexibility, heat resistance and so on of the film can be improved.

However, not all of the polylactic acid repeating units included in the polylactic acid resin and the resin composition needs to be in the form of a block copolymer with the polyurethane polyol repeating unit, and at least some of the polylactic acid repeating units may not be bonded to the polyurethane polyol repeating unit but may take a form of a polylactic acid homopolymer. In this case, the polylactic acid resin takes a mixed form in which the block copolymer exists together with a polymer of the polylactic acid repeating unit remaining uncoupled with the polyurethane repeating unit, that is, a polylactic acid homopolymer.

Meanwhile, the polylactic acid resin may include about 80 to 95 parts by weight of the hard segment and about 5 to 20 parts by weight of the soft segment, preferably about 82 to 92 parts by weight of the hard segment and about 8 to 18 parts by weight of the soft segment, and most preferably about 85 to 90 parts by weight of the hard segment and about 10 to 15 parts by weight of the soft segment, per 100 parts by weight of the total polylactic acid resin (when the polylactic acid homopolymer is included optionally, 100 parts by weight of the sum of the block copolymer and the homopolymer).

If the content of the soft segment is excessively high, it is difficult to provide the polylactic acid resin of high-molecular weight and the resin composition including the same, and mechanical properties such as strength of the film may decline. In addition, slipping property, workability or dimensional stability in packaging process using the film may be poor because of lowered glass transition temperature. On the other hand, if the content of the soft segment is excessively small, it is difficult to improve the flexibility of the polylactic acid resin and the film. Particularly, the glass transition temperature of the polylactic acid resin is increased excessively and flexibility of the film may be deteriorated, and it is difficult for the polyurethane polyol repeating unit of the soft segment to properly function as an initiator, which results in a decreasing polymerization conversion rate or impeding the formation of high-molecular weight polylactic acid resin.

The polylactic acid resin composition of one embodiment disclosed above includes a specific content of antioxidant in company with said polylactic acid resin. Such antioxidant included with a specific content can suppress a yellowing of the polylactic acid resin and can make the appearance of the resin composition and the film good, as disclosed above. And, the antioxidant can suppress oxidation or thermal degradation of the soft segment.

As the antioxidant, one or more antioxidant selected from a hindered phenol-based antioxidant, an amine-based antioxidant, a thio-based antioxidant, a phosphite-based antioxidant, and the like may be used, and other various known antioxidants applicable to a polylactic acid resin composition may be used too.

Since the resin composition of one embodiment has polyether polyol repeating units, it tends to be oxidized or thermal-degraded easily during high temperature polymerization reaction or high temperature extrusion or figuration process. Therefore, it is preferable to use thermal stabilizers, polymerization stailzers, or antioxidants disclosed above, as the antioxidant. Specific examples of the antioxidant include phosphoric acid-based thermal stabilizers such as phosphoric acid, trimethyl phosphate, or triethyl phosphate; hindered phenol-based primary antioxidants such as 2,6-di-t-butyl-p-cresol, octadecyl-3-(4-hydroxy-3,5-di-t-butylphenyl)propionate, tetrabis[methylene-3-(3,5-di-t-butyl-4-hydroxyphenyl)propionate]methane, 1,3,5-trimethyl-2,4,6-tris(3,5-di-t-butyl-4-hydroxybenzyl)benzene, 3,5-di-t-butyl-4-hydroxybenzylphosphite diethyl ester, 4,4'-butylidene-bis(3-methyl-6-t-butylphenol), 4,4'-thiobis(3-methyl-6-t-butylphenyl) or bis[3,3-bis-(4'-hydroxy-3'-tert-butyl-phenyl)butanoic acid]glycol ester; amine-based secondary antioxidants such as phenyl-α-naphthyl amine, phenyl-β-naphthyl amine, N,N'-diphenyl-p-phenylene diamine or N,N'-di-β-naphthyl-p-phenylene diamine; tiol-based secondary antioxidants such as dilauryl disulfide, dilauryl thiopropionate, distearyl thiopropionate, mercaptobenzothiazole or tetramethylthiuram disulfide tetrabis[methylene-3-(laurylthio)propionate]methane; or phsphite-based secondary antioxidants such as triphenyl phosphite, tris(nonylphenyl) phosphite, triisodecyl phosphite, bis(2,4-di-t-butylphenyl) pentaerythritol diphosphite or (1,1'-biphenyl)-4,4'-diylbis-phosphonous acid tetrakis[2,4-bis(1,1-dimethylethyl) phenyl]ester. Among them, it is most preferable to use a phosphite-based antioxidant in company with other antioxidant.

As disclosed above, the content of the antioxidant included in the resin composition may be about 100 to 1500 ppmw, preferably about 500 to 1500 ppmw, and more preferably about 1000 to 1500 ppmw, per the amount of the monomers used for forming the polylactic acid repeating unit in the resin composition. If the content of the antioxidant is too low, a yellowing of the polylactic acid resin may occur due to the oxidation of the flexible components such as said soft segments, and the external appearance of the resin composition and the film may be poor. On the other hand, if the content of the antioxidant is too high, the antioxidant may lessen the rate of polymerization of lactide and the hard segment including said polylactic acid repeating unit may not be formed properly, and the mechanical properties of the polylactic acid resin may be deteriorated.

In addition to the antioxidant disclosed above, the polylactic acid resin may contain various well-known additives, such as a plasticizer, a UV stabilizer, a color blocking agent, an anti-gloss agent, a deodorant, a flame retardant, an anti-weathering agent, an anti-static agent, a releasing agent, an antioxidant, an ion exchanger, a coloring pigment, and inorganic or organic particles, in such an amount so as not to have negative influences on the physical properties of the resin.

The examples of the plasticizer include phthalic acid ester plasticizers, such as phthalic acid diethyl, phthalic acid dioctyl, and phthalic acid dicyclohexyl; aliphatic dibasic acid ester plasticizers, such as adipic acid di-1-butyl, adipic acid di-n-octyl, sebacic acid di-n-butyl, and azelaic acid di-2-ethyl hexyl; phosphoric acid ester plasticizers, such as phosphoric acid diphenyl-2-ethyl hexyl and phosphoric acid diphenyl octyl; polyhydroxy carboxylic acid ester plasticizers, such as acetyl citric acid tributyl, acetyl citric acid tri-2-ethyl hexyl, and citric acid tributyl; aliphatic ester plasticizers, such as acetyl ricinoleic acid methyl, and stearic acid amyl; polyhydric alcohol ester plasticizers such as glycerin triacetate; and epoxy plasticizers, such as epoxylated soybean oil, epoxylated flaxseed oil fatty acid butyl ester, and epoxylated stearic acid octyl. And the examples of the coloring pigments may be inorganic pigments such as carbon black, titanium oxide, and zinc oxide; and organic pigments such as cyanines, phosphorous, quinines, perinones, isoindolinones, and thioindigos. Inorganic or organic particles may be used to improve the film in anti-blocking property, and the examples are silica, colloidal silica, alumina, alumina sol, talc, mica, calcium carbonate, polystyrene, poly methyl methacrylate, and silicon. Further, various additives applicable to polylactic acid resins or films thereof may be employed, and their kinds and acquisition routes are well known to those who skilled in the art.

The polylactic acid resin in the resin composition, for example, the block copolymer contained therein, may have a number average molecular weight of about 50,000 to 200,000, and preferably of about 50,000 to 150,000. Also, the polylactic acid resin may have a weight average molecular weight of about 100,000 to 400,000, and preferably about 100,000 to 320,000. The molecular weights may influence mechanical properties of the polylactic acid resin. When the molecular weight is too small, the polylactic acid resin may be poorly processed into films upon a melting process such as extrusion because its melt viscosity is too low and the film, although obtained, has poor mechanical properties such as strength. On the other hand, when the molecular weight is excessively high, the resin may be processed into a film with a poor yield in a melting process because its melt viscosity is too high.

The polylactic acid resin, for example, the block copolymer contained therein, may have a molecular weight distribution (Mw/Mn), defined as a ratio of weight average molecular weight (Mw) to number average molecular weight (Mn), of about 1.60 to 2.20, and preferably about 1.80 to 2.15. Given such a narrow molecular weight distribution, the polylactic acid resin has proper melt viscosity and melting properties so that it can be processed and extruded into films in a melting process. In addition, a high physical property such as strength can be found in the film made of the polylactic acid resin. In contrast, when the molecular weight distribution is too narrow (small), the polylactic acid resin may be difficult to process into a film because its melt viscosity is too high at a processing temperature for extrusion. On the other hand, when the molecular weight distribution is too wide (large), the film may become poor in physical properties such as strength, and the resin may be difficult to produce into films or may be poorly extruded into a film because its melt viscosity is too small.

Also, the polylactic acid resin may have the melting temperature (Tm) of about 160 to 178° C., and preferably about 165 to 175° C. If the melting temperature is too low, the film made of the polylactic acid resin may be poor in heat resistance, and if the melting temperature is excessively high, the polylactic acid resin requires high temperature for a melting process such as extrusion or increases the viscosity, thus making it difficult to extrude the resin into films.

In addition, the polylactic acid resin, for example, the block copolymer contained therein, has a glass transition temperature (Tg) of about 25 to 55° C., and preferably of about 30 to 55° C. As the polylactic acid resin has above glass transition temperature range, the film including the resin composition of one embodiment of the present invention can have optimized flexibility and stiffness and it can be used as a packaging film preferably. If the glass transition temperature of the polylactic acid resin is too low, the film exhibits excessively low stiffness even though it may have improved flexibility, and thus it may be poor in slipping property, workability, dimensional stability, heat resistance or anti-blocking property during a packaging process using the film and unsuitable to be applied to a packaging film. On the other hand, the film which has an excessively high glass transition temperature provides low flexibility and excessively high stiffness, so that it may be easily folded and the wrinkles therefrom do not disappear readily or it may exhibit the poor adhesion strength of adhesive interface to a target to be wrapped. In addition, it may cause the loud noise when it is used for packaging and there may be difficult to be used as a packaging film.

Meanwhile, the resin composition of one embodiment of the present invention may include residual monomers (for example, lactide monomers used for forming the polylactic acid repeating unit) less than about 1 wt %, preferably of about 0.01 to 0.5 wt %, per the weight of the polylactic acid resin included therein. As the resin composition includes the block copolymer having a specific structural feature and the polylactic acid resin including the same, and a specific content of the antioxidant, most of lactide monomers used in the preparation process participate in the polymerization and form the polylactic acid repeating unit. On the other hand, depolymerization or degradation of the polylactic acid resin does not occur actually. Therefore, the polylactic acid resin composition of one embodiment can keep the residual monomers, for example residual lactide monomers, to a minimum.

If the content of the residual monomers exceeds about 1 wt %, there may be an odour problem in the film forming process using the resin composition, and it may cause a decrease in strength of the final film due to the molecular weight reduction of the polylactic acid resin during the film forming process, and particularly, the monomers may bleed out when it is applied for a food packaging and it may cause a problem in safety.

Meanwhile, the polylactic acid resin may have a color-b value less than 6, and preferably of 5 or less, in pellet products. Since yellowing of the polylactic acid resin can be suppressed by the antioxidant included in the resin composition of one embodiment with an optimized content, it can have a color-b value less than 6. If the color-b value of the resin composition becomes 6 or more, the film appearance gets poor and the product value falls when it is used to a film.

Meanwhile, said polylactic acid resin composition may be prepared by a method including the steps of: ring-opening (co)polymerizing one or more monomers such as alkylene oxides so as to form a (co)polymer having polyether polyol repeating units; reacting the (co)polymer with a diisocyanate compound in the presence of a catalyst so as to form a (co)polymer having polyurethane polyol repeating units; and polycondensing a lactic acid (D- or L-lactic acid) or ring-opening polymerizing a lactide (D- or L-lactide) in the presence of said antioxidant and the (co)polymer having the polyurethane polyol repeating units.

Particularly, the polylactic acid having excellent properties disclosed above and the block copolymer included therein can be prepared by reacting a (co)polymer having polyether polyol repeating units and a diisocyanate compound so as to prepare a (co)polymer having the polyurethane polyol repeating unit in which said polyether polyol repeating units are linearly linked via urethane bonds and reacting the same with a lactic acid or a lactide. Moreover, the polylactic acid resin composition of one embodiment includes a specific content of the antioxidant so that it can be suppressed yellowing property. Such resin composition shows largely improved flexibility due to the polyurethane polyol repeating unit and makes it possible to provide a film which exhibits excellent mechanical properties, heat resistance, anti-blocking property, and so on, and has good appearance because of suppressed yellowing.

Meanwhile, when polyester polyol repeating unit is introduced into the polymer instead of the polyether polyol repeating unit or chain extension (or branch extension) is carried out after the polymerization of the polyether polyol and the lactic acid or lactide by changing the order, it is difficult to prepare the block copolymer having excellent properties disclosed above and the polylactic acid resin including the same, and it goes without saying that the resin composition of one embodiment of the invention cannot be obtained.

Hereinafter, the preparation method of polylactic acid resin composition will be explained in more detail.

First, a (co)polymer having a polyether polyol repeating unit is prepared by a ring-opening polymerization of one or more monomers such as an alkylene oxide, and this can be obtained according to a typical polymerization method of polyether polyol (co)polymers.

Then, the (co)polymer having a polyether polyol repeating unit, an diisocyanate compound, and a urethane reaction catalyst are loaded into a reactor, and subjected to a urethane reaction while heating and stirring. By this reaction, two isocyanate groups of the diisocyanate compound and the terminal hydroxyl groups of the (co)polymer can be combined to form urethane bonds. As a result, a (co)polymer having a polyurethane polyol repeating unit in which the polyether polyol repeating units are linearly linked via a urethane bond can be formed, and serve as a soft segment in the polylactic acid resin. In this context, the polyurethane polyol (co)polymer may be in the form of E-U-E-U-E in which the polyether polyol repeating units (E) are linearly linked via a urethane bond (U), and which has the polyether polyol repeating units at both terminal ends.

The urethane reaction may be obtained in the presence of a tin catalyst, for example, stannous octoate, dibutyltin dilaurate, or dioctyltin dilaurate. In addition, the urethane reaction can be obtained under the typical reaction condition for the preparation of polyurethane resin. For example, the diisocyanate compound and the polyether polyol (co)polymer can be reacted at 70 to 80° C. for 1 to 5 hrs in the presence of a urethane reaction catalyst in a nitrogen atmosphere to afford a (co)polymer having a polyurethane polyol repeating unit.

Subsequently, a polylactic acid resin composition of one embodiment including said block copolymer (or the polylactic acid resin including the same) and a specific content of the antioxidant can be prepared by a polycondensation reaction of the lactic acid (D- or L-lactic acid) or a ring-opening polymerization of the lactide (D- or L-lactide), in presence of the (co)polymer having a polyurethane polyol repeating unit and a specific content of the antioxidant. That is, according to these polymerizations, the polylactic acid repeating unit included as the hard segment is formed so as to prepare the polylactic acid resin while yellowing due to the oxidation of the soft segments is suppressed by the antioxidant. At this time, the polyurethane polyol repeating unit is bonded to at least some of the terminal group of the polylactic acid repeating unit so as to produce the block copolymer.

As the result, the block copolymer and the resin composition can be obtained which are quite different in structure and characteristics from conventional polylactic copolymers or branched copolymers which are prepared from a prepolymer consisting of a polyether polyol and a polylactic acid by chain extension with a diisocyanate compound or by reaction with a tri-functional isocyanate compound, respectively. Particularly, the block copolymer according to an embodiment may comprise a block (hard segment) in which the polylactic acid repeating units are linked to each other in a relatively large mass (molecular weight) unit, so that a film made of the polylactic acid resin comprising the block copolymer may have a narrow molecular weight distribution and a proper Tg, and thus may exhibit excellent mechanical properties and heat resistance. In contrast, because the conventional copolymers should have a structure in which polylactic acid repeating units with a small mass (molecular weight) are alternately and randomly distributed together with polyether polyol repeating units, the films obtained therefrom cannot satisfy the aforementioned properties such as glass transition temperature, and have poor mechanical properties or heat resistance. Furthermore, since the block copolymer can be prepared while yellowing is suppressed by the antioxidant during the polymerization, the resin composition and the film including the same can also exhibit excellent appearance property.

The ring opening polymerization of lactide may be performed in the presence of a metal catalyst such as an alkaline earth metal, a rare earth metal, a transition metal, aluminum, germanium, tin, or antimony. More specifically, the metal catalyst may be in the form of carbonic acid salts, alkoxide, halide, oxide, or titanium tetraisopropoxide carbonate. Stannous octoate, titanium tetraisopropoxide, or aluminum triisopropoxide can be used as metal catalyst preferably.

As the polylactic acid resin composition comprises a block copolymer (polylactic acid resin) in which specific hard segments and soft segments are combined, it can exhibit more improved flexibility while showing biodegradability of the polylactic acid resin. Furthermore, this structure can minimize the bleed-out of the soft segment which is responsible for the flexibility, and can largely prevent the soft segment-induced reduction of mechanical properties, heat resistance, transparency or haze property of the film.

Moreover, the polylactic acid resin is included with a specific content of the antioxidant and can show suppressed yellowing in the process of preparation or use, and the resin composition including these components makes it possible to provide a packaging film having superior properties such as largely improved flexibility and excellent mechanical property while exhibiting superior appearance and quality.

Thus, according to another embodiment of the invention, there is provided a packaging film comprising the polylactic acid resin. The packaging film can be preferably used as a packaging material in various fields because the film is superior in mechanical properties, heat resistance, anti-blocking property, transparency, and workability and can exhibit optimized flexibility and stiffness and non-yellowing good appearance, as it includes said polylactic acid resin composition.

The packaging film may have various thickness depending on uses thereof, and thickness of 5 to 500 μm. For example, when the packaging film is used as a wrap film or an envelope, it preferably may have a thickness of 5 to 100 μm in terms of flexibility, workability and strength, more preferably 7 to 50 μm, and further more preferably 7 to 30 μm.

And, when the packaging film with dimensions of a width of 10 mm and a length of 150 mm is subjected to a tensile test using Instron 1123 UTM at a temperature of 20° C., a relative humidity of 65%, and a drawing speed of 300 mm/min with a distance between grips of 100 mm, the packaging film may exhibit a total Young's modulus in both machine direction and transverse direction of about 350 to 750 kgf/mm$^2$, preferably about 450 to 650 kgf/mm$^2$, and more preferably about 500 to 600 kgf/mm$^2$. This range of total Young's modulus can reflect the optimized flexibility and stiffness of the packaging films, which seems to result from the structural characteristics and glass transition temperature satisfied in the polylactic acid resin.

However, when the total Young's modulus is too low, the film may undergo spreading or loosing phenomena during a film formation process, and exhibit poor workability, gas permeability, slit forming property, or dimensional stability. In addition, the deficient slipping property causes a poor release property or makes it difficult to use the film as a wrap film because the film deforms before wrapping a good such as a vessel or a food. On the other hand, when the total Young's modulus is too high, a folding line may remain giving a poor appearance once it is formed in the film during packaging, or the film may make it difficult to packaging because the film is not easily folded after the shape of the subject to be packaged.

And, the packaging film may have an initial tensile strength of 10 kgf/mm$^2$ or higher in both machine direction and transverse direction, preferably an initial tensile strength of about 12 kgf/mm$^2$ or higher, and more preferably an initial tensile strength of about 15 kgf/mm$^2$ to about 30 kgf/mm$^2$, as measured under the same conditions as for Young's modulus. If the initial tensile strength does not reach the lower limit, the film may exhibit poor workability and be easily tore, giving high risk of damaging the content packaged therewith.

Also, when it is treated for 1 hr in a 100° C. hot wind oven, the packaging film may exhibit a weight loss of about 3 wt % or less, preferably about 0.01 to 3.0 wt %, and more preferably about 0.05 to 1.0 wt %. This property may indicate that the packaging film may have excellent heat resistance and anti-bleed out properties. If the rate of weight loss is higher than 3 wt %, the film may have poor dimensional stability, and plasticizers, residual monomers, or additives can bleed out of the film, polluting the content packaged with the film.

The packaging film may exhibit haze of about 3% or less and light transmittance of about 85% or higher. Preferably, it may have haze of about 2% or less with light transmittance of about 90% or higher, and more preferably haze of about 1% or less with light transmittance of about 92% or higher. If the haze is too high or the light transmittance is too low, the film may make it difficult to readily identify the content packaged therewith, and do not allow vivid appearance of a printed image when it is applied to a multilayer film having a print layer.

The packaging film may be provided properties necessary for food packaging materials such as heat sealability, gas barrier against water vapor, oxygen or carbonic acid gas, releasability, printability, and the like which are required for the packaging film, so long as not deteriorating the advantages of the packaging film. For this, the polymer responsible for such property may be compounded with the film or a thermoplastic resin such as an acryl resin, a polyester resin, or a silicon resin, or an antistatic agent, a surfactant, a releasing agent and so on may be applied to at least one surface of the packaging film. Also, the packaging film may be formed into a multilayer film by coextrusion of other films such as polyolefin sealant. The packaging film may be formed into a multilayer film by adhesion or lamination as well.

Meanwhile, a typical method may be used to manufacture the packaging film mentioned above. For example, the polylactic acid resin may be formed into an oriented film (a drawn film) by an inflation process, a sequential biaxial stretching process, or a concurrent biaxial stretching process, followed by heat setting. In this regard, the formation of an oriented film may be accomplished by melt extruding the polylactic acid resin into sheets structure using an extruder equipped with a T die, thereafter cooling and solidifying the sheet-like extrudate to form an unoriented film (undrawn film), and stretching the unoriented film in both machine direction and transverse direction.

Drawing conditions of the film may be properly adjusted depending on heat shrinkability, dimensional stability, strength, and Young's modulus. For example, in consideration of the strength and flexibility of the final product, the drawing temperature may be preferably adjusted into a point over the glass transition temperature and less than the crystallization temperature of the polylactic acid resin. In addition, the drawing ratio may be set to be about 1.5 to 10 times for each direction, or may differ from the machine direction to the transverse direction.

After the formation of the oriented film, the packaging film may be finally accomplished by heat setting, and the heat setting is preferably performed at 100° C. or higher for about 10 sec for the strength and dimensional stability of the film.

Even after being stored for a long period time, the packaging film may have not only excellent flexibility and transparency but also sufficient mechanical properties such as strength and anti-bleed out property. In addition, the film may have biodegradability which is characteristic of the polylactic acid resin. Therefore, the packaging film may be preferably applied to various packaging fields. For example, the packaging film may be applied to industrial packaging materials including agricultural multi-films, sheets for protecting paint on automobiles, trash envelopes, and compost envelopes in addition to being used as, for example, wrappers and envelopes for daily consumption goods or foods, packaging films for chilled/frozen foods, shrinkable overwrapping films, bundling films, sanitary films such as sanitary pads or diapers, lamination films, shrinkable label packaging films, and mat films for packaging confectioneries.

Advantageous Effect of the Invention

As described above, the present invention provides a polylactic acid resin and a packaging film having optimized flexibility and stiffness, excellent mechanical properties, heat resistance, transparency, anti-blocking property, workability of a film, and the like while exhibiting biodegradability due to the nature the polylactic acid resin. Therefore, the polylactic acid resin and the packaging film can be applied to various fields as packaging materials, replacing packaging films made of petroleum-based resins and making a great contribution to prevention of environmental pollution.

DETAILS FOR PRACTICING THE INVENTION

The present invention will be explained in detail with reference to the following examples. However, these examples are only to illustrate the invention, and the scope of the invention is not limited thereto.

Definitions of Physical Properties and Measuring Methods:
physical properties stated in the following Examples are defined and measured as follows.

(1) NCO/OH: molar ratio of "isocyanate group of diisocyanate compound (e.g., hexamethylene diisocyanate)/terminal hydroxyl group of polyether polyol repeating unit (or (co)polymer)" for a reaction to form polyurethane polyol repeating units.

(2) OHV (KOH mg/g): measured by dissolving the polyurethane polyol repeating unit (or (co)polymer) in dichloromethane, acetylating the repeating unit, hydrolyzing the acetylated repeating unit to generate acetic acid, and titrating the acetic acid with 0.1 N KOH in methanol. It corresponds to the number of terminal hydroxyl groups of the polyurethane polyol repeating units (or (co)polymer).

(3) Mw and Mn (g/mol) and molecular weight distribution (Mw/Mn): measured by applying a 0.25 wt % solution of polylactic acid resin in chloroform, and gel permeation chromatography (manufactured by Viscotek TDA 305, Column: Shodex LF804*2ea). Polystyrene was used as a standard material to determine weight average molecular weight (Mw) and number average molecular weight (Mn). A molecular weight distribution was calculated from Mw and Mn.

(4) Tg (glass transition temperature, ° C.): measured with a differential scanning calorimeter (manufactured by TA Instruments) while quenching the melted sample and then increasing the temperature of the sample at a rate of 10° C./minute. The Tg was determined from the mid value of tangential line of an endothermic curve and a base line.

(5) Tm (melting temperature, ° C.): measured with a differential scanning colorimeter (manufactured by TA Instruments) while quenching the melted sample and then elevating the temperature of the sample at a rate of 10° C./min. The Tm was determined from the maximum value of the melt endothermic peak of the crystal.

(6) Residual monomer (lactide) content (wt %): measured by a GC analysis after dissolving 0.1 g of the resin in 4 ml chloroform, adding 10 ml hexane therein, and filtering the same.

(7) Content of polyurethane polyol repeating unit (wt %): the content of polyurethane polyol repeating unit in prepared polylactic acid resin was measured using a 600 MHz nuclear magnetic resonance (NMR) spectrometer.

(8) Pellet color-b: color-b value of the resin chip (pellet) was measured by using Chroma meter CR-410 manufactured by Konica Minolta Sensing Co., and a mean value of five measurements was expressed.

(9) Extrusion state: The polylactic acid resin was extruded at 200 to 250° C. into a sheet phase using a 30 mm single screw extruder equipped with a T die and the extrudated sheet was electrostatically deposited on a casting drum cooled to 5° C. so as to prepare a undrawn sheet. At this time, the melt viscosity of the extrudated sheet was measured using Physica Rheometer (Physica, USA). In detail, while maintaining the initial temperature of the extrudate, a shear force was applied thereto by a 25 mm parallel plate type instrument with a shear rate (1/s) of 1 during which complex viscosity (Pa·s) of the melted resin was measured with the Physica Rheometer. The states of melt viscosity (extrusion states) were evaluated according to the following standards.

◎: melt viscosity is good enough to perform winding around the cooling drum, ○: melt viscosity is slightly low and winding is possible although difficult, x: melt viscosity is too low to wind.

(10) Initial tensile strength (kgf/mm$^2$) MD, TD: A film sample with 150 mm in length and 10 mm in width was conditioned at a temperature of 20° C. and a humidity of 65% RH for 24 hrs, and measured the tensile strength according to ASTM D638 using Universal test machine (manufactured by INSTRON) at a drawing speed of 300 mm/min with the distance of 100 mm between grips. A mean value of five measurements was expressed. MD and TD stand for machine direction and transversal direction of the film, respectively.

(11) Elongation ratio (%) MD, TD: The elongation ratio was determined at the point when the film was torn under the same condition as in the tensile strength test of (10). A mean value of five measurements was expressed. MD and TD stand for machine direction and transversal direction of the film, respectively.

(12) F5 (kgf/mm$^2$) MD, TD: In the stress-strain curve obtained in the tensile strength test of (10), a tangential value at a stress point of 5% strain was determined, and a stress value at 5% elongation was obtained from the tangential slope. A mean value of five measurements was expressed. MD and TD stand for machine direction and transversal direction of the film, respectively.

(13) F100 (kgf/mm$^2$) MD: In the stress-strain curve obtained in the tensile strength test of (10), a tangent value at a stress point of 100% strain was determined, and a stress value at 100% elongation was obtained from the tangential slope. A mean value of five measurements was expressed. MD and TD stand for machine direction and transversal direction of the film, respectively.

(14) Young's modulus (kgf/mm$^2$) MD, TD: The same film sample as in the tensile strength test of (10) was measured for Young's modulus according to ASTM D638 using UTM (manufactured by INSTRON) at a drawing speed of 300 mm/min with a distance between grips of 100 mm. A mean value of five measurements was expressed. As the Young's modulus, particularly, a sum of Young's modulus values measured in machine direction and transversal direction, corresponds to the flexibility of the film, a lower Young's modulus value may indicate higher flexibility. MD and TD stand for machine direction and transversal direction of the film, respectively.

(15) Wave pattern (horizontal line): Degrees of the wave patterns which are produced due to a difference in melt viscosity when two kinds of resins with different molecular weights or a resin and a plasticizer are compounded and extruded into a film are evaluated on an A4-size film sample according to the following criteria.

◎: no wave patterns (horizontal lines), ○: Up to 3 wave patterns (horizontal lines), x: 5 or more wave patterns (horizontal lines).

(16) 100° C. Rate of weight loss (%): A film sample was conditioned for 24 hrs at 23° C. and 65% RH and weighed before heat treatment. Then, it was treated for 60 min in a 100° C. hot wind oven, and again conditioned under the same conditions as in pre-heat treatment, and weighed. Percentages of the pre-treatment weight to the changes between pre- and post-treatment processes were calculated.

(17) Pin hole and anti-bleed-out: After the heat treatment of (15), the surface of the film sample was observed to examine the generation of pin holes. In addition, the bleed-out of the low-molecular weight plasticizer on the film surface was evaluated with tactile sensation on an A4-size film sample according to the following criteria.

◎: neither pin holes nor bleed-out, ○: up to 5 pin holes or bleed-out observed, but not serious, x: 5 or more pin holes or serious bleed-out.

(18) Haze (%) and light transmittance (%): A film sample was conditioned for 24 hrs at 23° C. and 65% RH, and the average haze value was measured at three different points according to JIS K7136 using a haze meter (Model Japan NDH2000).

(19) Anti-blocking property: The antistatic surface of a film sample was matched with the print surface by using COLORIT P type stamping of foil (Kurz), and left for 24 hrs at 40° C. under a pressure of 1 kg/cm$^2$, thereafter the blocking between the antistatic layer and the print surface was observed. Based on the observation, the anti-blocking property of the film between the anti-static layer (layer A)

and the print surface of the in-mold transfer foil was evaluated according to the following criteria. Practical performance is guaranteed by at least ○.

⊚: no changes, ○: slight surface change (less than 5%), x: defoliated by 5% or higher.

(20) Yellowing coloration of film: after crashing the film sample with a crasher, and carrying out a moisture absorption dry and a crystallization at 120° C., the sample was melted at about 200° C. and made into chips again by a small single screw extruder (Haake Co., Rheomics 600 extruder). The difference of color-b values before/after said film forming process was measured and the yellowing coloration was evaluated according to the following criteria.

⊚: 2 or less, almost no yellowing, ○: 5 or less, yellowing appeared slightly, x: larger than 5, yellowing appeared heavily.

Materials used in the following Examples and Comparative Examples are given as follows:

1. Polyether Polyol Repeating Unit (or (Co)Polymer) or Correspondents Thereto
    PPDO 2.4: poly(1,3-propanediol); number average molecular weight 2400
    PPDO 2.0: poly(1,3-propanediol); number average molecular weight 2000
    PPDO 1.0: poly(1,3-propanediol); number average molecular weight 1000
    PTMEG 3.0: polytetramethylene glycol; number average molecular weight 3000
    PTMEG 2.0: polytetramethylene glycol; number average molecular weight 2000
    PTMEG 1.0: polytetramethylene glycol; number average molecular weight 1000
    PEG 8.0: polyethylene glycol; number average molecular weight 8000
    PBSA 11.0: aliphatic polyester polyol prepared by the polycondensation of 1,4-butanediol, succinic acid, and adipic acid; number average molecular weight 11,000
2. Diisocyanate Compound (or Tri- or Higher Functional Isocyanate)
    HDI: hexamethylenediisocyanate
    D-L75: Bayer, Desmodur L75 (TRIMETHYLOL PROPANE+3 toluene diisocyanate)
3. Lactide Monomer
    L- or D-lactide: product manufactured by Purac, optical purity of 99.5% or higher
4. Antioxidants, Etc.
    TNPP: Tris(nonylphenyl) phosphite
    U626: Bis(2,4-di-tbutylphenyl)Pentaerythritol Diphosphite
    S412: Tetrakis[methane-3-(laurylthio)propionate]methane
    PEPQ: (1,1'-Biphenyl)-4,4'-Diylbisphosphonous acid tetrakis[2,4-bis(1,1-dimethylethyl)phenyl]ester
    I-1076: octadecyl 3-(3,5-di-tert-butyl-4-hydroxyphenyl) propionate
    O3: Bis[3,3-bis-(4'-hydroxy-3'-tert-butyl-phenyl)butanoicacid]glycol ester A. Preparation of Polylactic Acid Resins A to J According to the instructions shown in Table 1 below, reactants and catalyst were fed into an 8 L reactor equipped with a nitrogen tube, a stirrer, a catalyst inlet, an effluent condenser and a vacuum system. As the catalyst, dibutyltin dilaurate was used in an amount of 130 ppmw based on the total weight of the reactants. Under a nitrogen atmosphere, a urethane reaction was carried out at 70° C. for 2 hrs, and then 4 kg of L-(or D-) lactide was fed into the reactor, followed by five times of nitrogen flushing.

Subsequently, the temperature was elevated to 150° C. to completely dissolve the L-(or D-) lactide, and tin 2-ethylhexylate catalyst of 120 ppmw per the total content of the reactants was diluted in 500 ml toluene and the diluted solution was fed into the reactor through the catalyst inlet. Under a nitrogen pressure of 1 kg, the reaction was carried out at 185° C. for 2 hrs, and then phosphoric acid was fed in an amount of 200 ppmw through the catalyst inlet and blended with the reaction mixture for 15 minutes to inactivate the catalyst. After the catalyst deactivation, the vacuum was applied until the pressure reached 0.5 torr to remove unrelated L- (or D-) lactide (about 5 wt % of the initially fed weight). The molecular weight, Tg, Tm, and so on of the obtained resin were measured and given in Table 1.

B. Preparation of Polylactic Acid Resin L

According to the instructions shown in Table 1 below, polyol and 4 kg of L-lactide were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the L-lactide, and a dilution of 120 ppmw of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppmw through the catalyst inlet and blended with the reaction mixture for 15 minutes to inactivate the catalyst. Until the pressure reached 0.5 torr, vacuum was applied to remove unreacted L-lactide. The molecular weight, Tg, Tm, and so on of the obtained resin were measured and given in Table 1.

C. Preparation of Polylactic Acid Resin M

According to the instructions shown in Table 1 below, 6 g of 1-dodecanol and 4 kg of L-lactide were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the L-lactide, and a dilution of 120 ppmw of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppmw through the catalyst inlet and blended with the reaction mixture for 15 minutes to inactivate the catalyst. Until the pressure reached 0.5 torr, vacuum was applied to remove unreacted L-lactide. The molecular weight, Tg, Tm, and so on of the obtained resin were measured and given in Table 1.

D. Preparation of Polylactic Acid Resin O

According to the instruction shown in Table 1 below, PBSA polyol (polyester polyol) and HDI were fed into an 8 L reactor equipped with a nitrogen tube, a stirrer, a catalyst inlet, an effluent condenser and a vacuum system, followed by five times of nitrogen flushing. As a catalyst, dibutyltin dilaurate was used in an amount of 130 ppmw based on the total weight of the reactants. Under a nitrogen atmosphere, a urethane reaction was carried out at 190° C. for 2 hrs, and then 4 kg of L-lactide was fed into the reactor, and completely dissolved at 190° C. in a nitrogen atmosphere. Tin 2-ethylhexylate as an addition polymerization catalyst, and dibutyltin dilaurate as an ester and/or ester amide exchange catalyst were diluted in amounts of 120 ppmw and 1000 ppmw, respectively, based on the total weight of the reactants, in 500 ml of toluene, and added to the reactor. Under a nitrogen pressure of 1 kg, the reaction was carried out at 190° C. for 2 hrs, after which phosphoric acid was fed in an amount of 200 ppmw through the catalyst inlet and blended with the reaction mixture for 15 minutes to inactivate the catalysts. Until the pressure reached 0.5 torr, vacuum was applied to remove unreacted L-lactide (about 5 wt % of the initial amount). The molecular weight, Tg, Tm, and so on of the obtained resin were measured and given in Table 1.

E. Preparation of Polylactic Acid Resin P

According to the instructions shown in Table 1 below, PEG, 3.6 kg of L-lactide, and 0.4 kg of D-lactide were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the lactides, and a dilution of 120 ppmw of the catalyst tin 2-ethylhexylate in 500 ml of toluene was fed into the reactor through the catalyst inlet. Under a nitrogen pressure of 1 kg, the reaction was carried out at 185° C. for 2 hrs, after which phosphoric acid was fed in an amount of 200 ppmw through the catalyst inlet and blended with the reaction mixture for 15 minutes to inactivate the catalyst. Until the pressure reached 0.5 torr, vacuum was applied to remove unreacted L-lactide (about 5 wt % of the initial amount). Then, HDI and a dilution of 120 ppmw of the catalyst dibutyltin dilaurate in 500 ml of toluene were introduced through the catalyst inlet into the reactor as shown in Table 1. Under a nitrogen atmosphere, the polymerization was carried out at 190° C. for 1 hr. The molecular weight, Tg, Tm, and so on of the obtained resin were measured and given in Table 1.

F. Preparation of Polylactic Acid Resin Q

According to the instructions shown in Table 1 below, PEG, 3.6 kg of L-lactide, and 0.4 kg of D-lactide were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the lactides, and a dilution of 120 ppmw of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppmw through the catalyst inlet and blended with the reaction mixture for 15 minutes to inactivate the catalyst. Until the pressure reached 0.5 torr, vacuum was applied to remove unreacted L-lactide (about 5 wt % of the initial amount). Then, D-L75 and a dilution of 120 ppmw of the catalyst dibutyltin dilaurate in 500 ml of toluene were introduced through the catalyst inlet into the reactor as shown in Table 1. Under a nitrogen atmosphere, the polymerization was carried out at 190° C. for 1 hr. The molecular weight, Tg, Tm, and so on of the obtained resin were measured and given in Table 1.

G. Examples 1 to 5 and Comparative Examples 1, and 6 to 8: Film Formation

The polylactic acid resins prepared in A to F were dried at 80° C. for 6 hrs under a reduced pressure of 1 torr, and then extruded into a sheet structure using a 30-mm single screw extruder equipped with a T die under the temperature conditions shown in Table 2. The extruded sheets were electrostatically deposited on a casting drum cooled to 5° C. to give unoriented films (undrawn films). They were stretched to 3 times in a machine direction between heating roles under the drawing conditions shown in Table 2. Subsequently, the films were fixed with clips, then stretch to 4 times in a tenter frame, and fixed again in the transverse direction, followed by heat treatment at 120° C. for 60 sec to afford a bi-axially oriented polylactic acid resin film of 20 μm thick. The evaluation results of the films are summarized in Table 2.

H. Example 6 and Comparative Examples 2 to 5: Film Formation

The resin compositions or polyols shown in Table 2 were dried at 80° C. for 6 hrs under a reduced pressure of 1 torr, and melt kneaded at 190° C. in a twin screw kneader to give chips of the composition. They were dried at 80° C. for 6 hrs under a reduced pressure of 1 torr, and produced into a bi-axially oriented polylactic acid resin film of 20 μm thick in the same manner as in G. The evaluation results of the films are summarized in Table 2.

TABLE 1

| | Resin | | | | | | | | | | |
|---|---|---|---|---|---|---|---|---|---|---|---|
| | A | B | C | D | E | F | L | M | O | P | Q |
| PPDO 2.4 (g) | | 378.8 | | | | 542.8 | | | | | |
| PPDO 2.0 (g) | | | | | | | | | | | |
| PPDO 1.0 (g) | | | 209.5 | | | | | | | | |
| PTMEG 3.0 (g) | 386.9 | | | | | | | | | | |
| PTMEG 2.0 (g) | | | | | 755.5 | | | | | | |
| PTMEG 1.0 (g) | | | | 184.8 | | | | | | | |
| PEG 8.0 (g) | | | | | | | 2400 | | | 800 | 800 |
| PBSA 11.0 (g) | | | | | | | | 800 | | | |
| HDI (g) | 13.1 | 21.2 | 30.5 | 15.2 | 44.4 | 17.1 | | 9.5 | 10.1 | | |
| D-L75 (g) | | | | | | | | | | | 14.9 |
| NCO/OH | 0.6 | 0.8 | 0.9 | 0.50 | 0.70 | 0.45 | | 0.8 | 0.7 | 0.65 | |
| OHV (KOHmg/g) | 10 | 6 | 4 | 20 | 6 | 22 | 47 | 3 | 5.5 | 5.5 | |
| TNPP (g) | | | 4 | | | | | | | | |
| U626 (g) | 2 | 3 | | | 6 | 0.1 | | 3 | | | |
| PEPQ (g) | | | | 4 | | | | | | | |
| S412 (g) | | | | 2 | | | | | | | |
| I-1076 (g) | | 1 | | | | | | | | | |
| O3 (g) | 2 | | | | | | | | | | |
| L-Lactide (g) | 4000 | | 4000 | | 4000 | 4000 | 4000 | 4000 | 4000 | 3600 | 3600 |
| D-Lactide (g) | | 4000 | | 4000 | | | | | | 400 | 400 |
| Antioxidant Content (ppmw) | 1000 | 1000 | 1000 | 1500 | 1500 | 25 | 0 | 750 | 0 | 0 | 0 |
| IV (dl/g) | 0.95 | 1.35 | 1.52 | 0.64 | 0.92 | 0.58 | 0.2 | 1.55 | | | |
| Mn (×1,000, g/mol) | 75 | 122 | 148 | 60 | 70 | 48 | 14 | 128 | 65 | 60 | 55 |

TABLE 1-continued

| | Resin | | | | | | | | | | |
|---|---|---|---|---|---|---|---|---|---|---|---|
| | A | B | C | D | E | F | L | M | O | P | Q |
| Mw (×1,000, g/mol) | 148 | 245 | 315 | 115 | 149 | 90 | 26 | 295 | 185 | 150 | 215 |
| MWD | 1.97 | 2.01 | 2.13 | 1.92 | 2.13 | 1.88 | 1.86 | 2.30 | 2.85 | 2.50 | 3.91 |
| Tg (° C.) | 49 | 42 | 54 | 55 | 31 | 37 | 15 | 65 | 18 | 22 | 17 |
| Tm (° C.) | 170 | 168 | 172 | 173 | 164 | 167 | 130 | 176 | 85, 165 | 145 | 142 |
| Color b | 4 | 3 | 2 | 5 | 6 | 8 | 5 | 4 | 13 | 6 | 6 |
| PU polyol repeating unit Content (wt %) | 10% | 10% | 6% | 5% | 17% | 13% | 39% | 0% | 18% | 18% | 17% |
| Residual Monomer Content (wt %) | 0.45 | 0.4 | 0.3 | 0.65 | 0.55 | 0.5 | 8 | 0.3 | 2.5 | 1.2 | 1.5 |

As shown in the Table 1, resins A~E were polylactic acid resins (block copolymers) which were prepared by reacting poly(1,3-propanediol) having a molecular weight of 1000 to 2400 or polytetramethylene glycol having a number average molecular weight of 1000 to 3000 with 1,6-hexamethylene diisocyanate at a molar ratio of NCO/OHV of 0.5 to 0.99 to give a polyurethane polyol repeating unit (or (co)polymer) in which polyether polyol repeating units, such as poly(1,3-propanediol), were linearly linked, and using the same as a soft segment and as an initiator for the polymerization of a hard segment. Furthermore, the polylactic acid resin is polymerized in the presence of a specific content of antioxidant, it can be recognized that the resin exhibits low color-b value because of suppressed yellowing and the residual monomer content is low.

In the polylactic acid resins, the polyurethane polyol repeating unit (or (co)polymer) was found to have an OHV of from 3 to 20, so that they could act as an initiator for the polymerization of polylactic acid repeating units. In addition, the final polylactic acid resins A to E had a weight average molecular weight of 100,000 to 400,000, a molecular weight distribution of 1.80 to 2.15, Tg of 25 to 55° C., and Tm of 160 to 178° C. Given these thermal parameters, the resin can be prepared into chips, and they alone can be produced into films, as the resins exhibit a suitable melt viscosity at a film extrusion temperature, e.g., 200° C. or higher. Furthermore, it was recognized that yellowing was scarcely observed due to low residual lactide content in the resin less than 1 wt % and low color-b value less than 6.

In contrast, it was recognized that resin F in which the content of the amount used of the polyurethane polyol repeating unit (or (co)polymer), the soft segment, was less than 5 wt % showed Tg higher than 55° C. In addition, it was recognized that its color-b value was relatively high because the molecular weight was not sufficient and the antioxidant content, which was 25 ppmw, was lower than the amount of the monomer (lactide) used for forming the polylactic acid repeating unit.

And, resin L was the polylactic acid resin prepared by directly utilizing a poly(1,3-propandiol) having a molecular weight of 2000 and a polyethylene glycol having a molecular weight of 8000 as an initiator for the ring-opening polymerization of L-lactide, without a urethane reaction. In this case, however, the OHV of the initiator was too high to obtain a polylactic acid resin with a desired weight average molecular weight. Furthermore, it was recognized that resin L includes much residual lactide and its Tg was just 15° C. and had low polymerization conversion because it did not include antioxidant. In addition, it was recognized that the resin was too low in melt viscosity to be produced into a film alone at a film extrusion temperature of 200° C. or more.

Resin M was the polylactic acid resin prepared by a ring opening polymerization of L-lactide using a small amount of 1-dodecanol as an initiator according to a conventional preparation method of a polylactic acid resin, without introducing a soft segment (polyurethane polyol repeating unit). This polylactic acid resin alone could be produced into a film at a film extrusion temperature of 200° C. or higher. However, it was found to have a molecular weight distribution of as large as 2.30 which is very broad.

Also, resin O was the polylactic copolymer which was prepared by employing a polyurethane formed from a polyester polyol repeating unit, such as PBSA, instead of the polyether polyol repeating unit, as a soft segment while copolymerizing the polyurethane with lactide in the presence of a ring opening polymerization catalyst, an ester exchange catalyst, and/or an ester amide exchange catalyst. In this polylactic copolymer, the polyurethane was randomly introduced in small segment sizes and copolymerized with the polylactic acid repeating unit during the ester and/or ester amid exchange reaction. Resin O had as wide a molecular weight distribution as 2.85, and its Tg was low and its Tm was relatively low as well. Furthermore, resin O did not include an antioxidant and thus it was recognized that the residual lactide content was relatively high and the color-b value was considerably high.

Finally, resins P and Q were a polylactic copolymer (P) or a branched copolymer (Q) which were prepared by addition polymerization of polyether polyol repeating units with lactide to form a prepolymer and then by subjecting the prepolymer to chain extension with a diisocyanate compound (copolymer P) or to a reaction with a tri-functional isocyanate compound (copolymer Q), respectively. Resins P and Q had as wide a molecular weight distribution as 2.50 and 3.91, and their Tg were low and their Tm were relatively low as well. Furthermore, resins P and Q did not include an antioxidant and thus it was recognized that the residual lactide content was relatively high and the color-b value was considerably high.

TABLE 2

| | Example | | | | | | Comparative Example | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Resin 1 (wt %) | A 100 | B 100 | C 100 | D 100 | E 100 | E 50 | M 100 | F 40 | L 40 | PDO 10 | PBSA 10 | O 100 | P 100 | Q 100 |
| Resin 2 (wt %) | | | | | | M 50 | | M 60 | M 60 | M 90 | M 90 | | | |
| Extrusion Temp. (° C.) | 220 | 230 | 240 | 200 | 200 | 240 | 240 | 200 | 200 | 200 | 200 | 200 | 200 | 240 |
| Melt Visco. (Pa · s) | 1100 | 1600 | 2100 | 580 | 1000 | 1400 | 2000 | 450 | 250 | 1200 | 1400 | 1400 | 1200 | 1800 |
| Extrusion state | ◎ | ◎ | ◎ | ○ | ◎ | ◎ | ◎ | X | X | ◎ | ○ | ◎ | X | X |
| Drawing Temp. (° C.) | 81 | 80 | 80 | 70 | 80 | 80 | 80 | 80 | 80 | 80 | 80 | 80 | 80 | 80 |
| Drawing Time (sec) | 20 | 20 | 20 | 30 | 20 | 20 | 20 | 20 | 20 | 20 | 20 | 20 | 20 | 20 |
| Drawing Ratio | 3 × 4 | 3 × 4 | 3 × 4 | 3 × 4 | 3 × 4 | 3 × 4 | 3 × 4 | 3 × 4 | 3 × 4 | 3 × 4 | 3 × 4 | 3 × 4 | 3 × 4 | 3 × 4 |
| Film Thick. (um) | 20 | 20 | 20 | 21 | 20 | 20 | 20 | 20 | 20 | 20 | 20 | 20 | 20 | 20 |
| Initial Tensile Strength (kgf/mm$^2$) MD | 10 | 15 | 18 | 10 | 12 | 17 | 20 | 7 | 2.5 | 15 | 9 | 7 | 6 | 14 |
| Initial Tensile Strength (kgf/mm$^2$) TD | 13 | 20 | 25 | 14 | 14 | 22 | 26 | 12 | 3.1 | 18 | 10 | 8 | 7 | 17 |
| Sum of Tensile Strength (kgf/mm$^2$) | 23 | 35 | 43 | 24 | 26 | 39 | 46 | 19 | 5.6 | 33 | 19 | 15 | 13 | 31 |
| Elongation Rate (%) MD | 117 | 140 | 120 | 144 | 160 | 137 | 124 | 114 | 152 | 145 | 135 | 212 | 210 | 85 |
| Elongation Rate (%) TD | 70 | 70 | 75 | 78 | 98 | 89 | 86 | 53 | 89 | 66 | 98 | 105 | 98 | 65 |
| F5 (kgf/mm$^2$) MD | 5.3 | 8 | 10 | 5 | 4.8 | 9.4 | 9.8 | 5.1 | 1.5 | 8.7 | 7.9 | 5 | 6 | 11 |
| F5 (kgf/mm$^2$) TD | 8.1 | 10 | 11 | 7.7 | 7.8 | 12 | 12 | 9.4 | 2.1 | 11 | 9.8 | 6.5 | 6.8 | 13 |
| F100 (kgf/mm$^2$) MD | 8.1 | 15 | 16 | 6.7 | 12 | 17 | 17 | 7.9 | 1.8 | 5.6 | 6.1 | 4.2 | 4.5 | 8.8 |
| Young's Modulus (kgf/mm$^2$) MD | 236 | 230 | 330 | 212 | 180 | 242 | 386 | 312 | 179 | 338 | 327 | 150 | 160 | 302 |
| Young's Modulus (kgf/mm$^2$) TD | 295 | 280 | 418 | 319 | 235 | 300 | 460 | 418 | 241 | 419 | 412 | 165 | 175 | 355 |
| Sum of Young's Modulus (kgf/mm$^2$) | 531 | 510 | 748 | 531 | 415 | 542 | 846 | 730 | 420 | 757 | 739 | 315 | 335 | 657 |
| Wave pattern | ◎ | ◎ | ◎ | ◎ | ◎ | ◎ | ◎ | X | X | ○ | ○ | ◎ | X | X |
| Pin hole | ◎ | ◎ | ◎ | ◎ | ◎ | ◎ | ◎ | ◎ | X | ◎ | ○ | X | X | X |
| 100° C. Rate of weight loss (%) | 0.2 | 0.2 | 0.2 | 0.3 | 0.4 | 0.3 | 0.2 | 0.2 | 6 | 5.1 | 5.5 | 7.2 | 3.8 | 4.7 |
| Bleed-out | ◎ | ◎ | ◎ | ◎ | ◎ | ◎ | ◎ | ◎ | ◎ | X | X | ○ | ○ | ○ |
| Haze (%) | 0.2 | 0.2 | 0.2 | 0.3 | 0.3 | 0.2 | 0.7 | 0.5 | 0.7 | 10 | 14 | 2.1 | 1.1 | 1.8 |
| Transmittance (%) | 94 | 94 | 94 | 94 | 93 | 94 | 94 | 88 | 87 | 89 | 81 | 84 | 84 | 85 |
| Anti-blocking Property | ◎ | ◎ | ◎ | ◎ | ○ | ○ | ◎ | ◎ | X | ○ | ○ | X | X | X |
| Yellowing Coloration | ◎ | ◎ | ◎ | ◎ | ◎ | ◎ | ◎ | ○ | X | X | X | X | X | X |

As shown in the Table 2, the films of Examples 1 to 5 were prepared from the polylactic acid resin compositions of the present invention including a specific content of the antioxidant and the polylactic acid resins which included the soft segment (polyurethane polyol repeating unit) in an amount of 5 to 20 wt % and had the properties of low color-b value, a weight average molecular weight of 100,000 to 400,000, a molecular weight distribution of 1.80 to 2.15, and Tm of 160 to 178° C. Furthermore, the film of Example 6 was prepared by using the composition in which the polylactic acid resin of the present invention (resin E), a general polylactic acid resin (resin M), and the antioxidant were mixed together.

All of the films of Examples 1 to 6 were found to have an initial tensile strength of 10 kgf/mm$^2$ or higher in both machine direction and transverse direction, which indicates excellent mechanical properties. In addition, they exhibited a total Young's modulus in both machine direction and transverse direction of 750 kgf/mm$^2$ or less, which reflects excellent flexibility. This optimized range of total Young's modulus was helpful in maintaining a suitable level of stiffness. Also, they were found to be superior in various physical properties including transparency, haze, anti-blocking property, and heat resistance as demonstrated by a rate of weight loss of 3 wt % or less after treatment for 1 hr in a 100° C. hot wind oven, a haze of 5% or less, and a light transmittance of 90% or higher. Furthermore, the films of Examples 1 to 6 had good appearance and were superior in thermal stability, and the color-b change (yellowing coloration) was not severe even after the film extrusion process.

In contrast, the film of Comparative Example 1 which was prepared from general polylactic acid resin M exhibited a total Young's modulus in both machine direction and transverse direction of exceeding 750 kgf/mm$^2$, so that the flexibility was too insufficient to use the film as a packaging film. In addition, the extrusion state of the film of Comparative Example 3 made from resins M and L together was poor, because of large difference of melt viscosity between the two resins. Wave patterns were also found in the final film. Furthermore, the appearance of the film was poor due to pin holes on the film generated by high content of the residual lactide, and the excessively low Tg of resin L caused a problem to the anti-blocking property. The initial tensile strength, the transparency, and the yellowing coloration were poor as well.

And, in Comparative Examples 4 and 5, the films were formed by just compounding poly(1,3-propanediol) having a number average molecular weight of 2400 and an aliphatic polyester polyol having a number average molecular weight of 11,000 prepared by a polycondensation of 1,4-butanediol, succinic acid, and adipic acid with resin M as plasticizing components, without using the polyurethane polyol repeating unit, the soft segment of the resin. The films of Comparative Examples 4 and 5 had high haze and were poor in yellowing coloration because of the incomplete dispersion of the plasticizing components in the resin, and it was recognized that the plasticizing components bleed out from the surface of the film after time passes.

In addition, resin F of Comparative Example 2 has low molecular weight and thus it could not be extruded into a film. However, it was possible to carry out a film extrusion by compounding the same with general polylactic acid resin M which had no soft segment but the extrusion state was poor and wave patterns were also found in the final film because of large difference of melt viscosity between the two resins. Initial tensile strength and transmittance of the films were also poor due to this. In addition, it was recognized that partial yellowing colorations occurred during the film formation due to the low antioxidant content.

And, the film of Comparative Example 6 was formed of a copolymer including a polyester polyol repeating unit and having a wide molecular weight distribution. This film exhibited relatively good flexibility because polyurethane components responsible for flexibility were randomly introduced as small segment units. Nonetheless, it was difficult to be formed to the film because it exhibited a blocking problem as well as poor heat resistance due to low Tg and Tm, as the polylactic acid repeating units were introduced in relatively small sizes as well. In addition, the film was high in haze with low transparency due to low compatibility between the polyester polyols and the polylactic acids, both responsible for the flexibility. A wide molecular weight distribution appeared due to the ester and/or ester amide exchange reaction during the preparation of the resin incurred non-uniform melt properties, and deterioration in the film extrusion state and mechanical properties.

The films of Comparative Examples 7 and 8 were formed of the resins which were prepared by addition polymerizing of polyether polyol with lactide to form a prepolymer and then by subjecting the prepolymer to urethane reaction with diisocyanate or tri- or higher functional compounds. These resins also had a wide molecular weight distribution and the polyether polyol repeating units in the resins were linearly linked via urethane bonds but it did not satisfy the structural characteristics of the present invention including the polylactic acid repeating units of relatively high molecular weight as the hard segments in addition. These films were also found to exhibit non-uniform melt viscosity and poor mechanical properties. Furthermore, since the block characteristics of the hard segment and the soft segment of the resin were deteriorated and the resin had low Tm and Tg, the resin had low heat resistance followed by difficulties in forming into a film due to a blocking problem.

In addition, the films of Comparative Examples 6 to 8 exhibited quite poor external appearance in the film state due to high residual lactide content and relatively high color-b value, and 100° C. rate of weight loss was commercially inadequate. Furthermore, since the films of Comparative Examples 6 to 8 were required of using excessive catalysts in the preparation process of the resins, degradation of the polylactic acid resins were induced in the film formation or the use. Thus, they were poor in the yellowing coloration of the films and generated pin holes and a significant weight change at high temperatures, exhibiting poor stability.

What is claimed is:

1. A polylactic acid resin composition, comprising:
a polylactic acid resin including a hard segment comprising a polylactic acid repeating unit of the following Chemical Formula 1, and a soft segment comprising a polyurethane polyol repeating unit in which structures of the following Chemical Formula 2 are linearly linked to each other via a urethane bond, wherein the urethane bond is bonded directly to each of the structures of Chemical Formula 2; and
an antioxidant of 100 to 1500 ppmw per the amount of the monomers for forming the polylactic acid repeating unit:

[Chemical Formula 1]

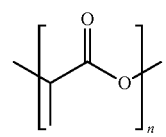

[Chemical Formula 2]

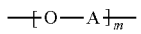

wherein A is a linear or branched alkylene of 2 to 5 carbon atoms, m is an integer of 10 to 100, and n is an integer of 700 to 5000.

2. The polylactic acid resin composition of claim 1, wherein the polylactic acid resin has a number average molecular weight of 50,000 to 200,000 and a weight average molecular weight of 100,000 to 400,000.

3. The polylactic acid resin composition of claim 1, wherein the polylactic acid resin has a glass transition temperature (Tg) of 25 to 55° C. and a melt temperature (Tm) of 160 to 178° C.

4. The polylactic acid resin composition of claim 1, wherein the urethane bond is formed by a reaction between a terminal hydroxyl group of the structures of Chemical Formula 2 and a diisocyanate compound, and the structures of Chemical Formula 2 are linearly linked via the urethane bond to form the polyurethane polyol repeating unit.

5. The polylactic acid resin composition of claim 4, wherein the polylactic acid resin includes a block copolymer in which a terminal carboxyl group of the polylactic acid repeating unit and a terminal hydroxyl group of the polyurethane polyol repeating unit are linked via an ester bond.

6. The polylactic acid resin composition of claim 5, wherein the polylactic acid resin comprises the block copolymer; and the polylactic acid repeating unit which remains unlinked to the polyurethane polyol repeating unit.

7. The polylactic acid resin composition of claim 4, wherein a molar ratio of the terminal hydroxyl group of the structures of Chemical Formula 2 and the isocyanate group of the diisocyanate compound is 1:0.50 to 1:0.99.

8. The polylactic acid resin composition of claim 1, wherein the structures of Chemical Formula 2 have a number average molecular weight of 450 to 9000.

9. The polylactic acid resin composition of claim 1, wherein the polylactic acid resin comprises 80 to 95 parts by weight of the hard segment and 5 to 20 parts by weight of the soft segment per 100 parts by weight of the polylactic acid resin.

10. The polylactic acid resin composition of claim 1, having a color-b value less than 6.

11. The polylactic acid resin composition of claim 1, wherein the residual monomer content is less than 1 wt % per the weight of the polylactic acid resin.

12. The polylactic acid resin composition of claim 1, wherein the antioxidant is at least one selected from the group consisting of a hindered phenol-based antioxidant, an amine-based antioxidant, a thio-based antioxidant, and a phosphite-based antioxidant.

13. A packaging film, including the polylactic acid resin composition of claim 1.

14. The packaging film of claim 13, having a thickness of 5 to 500 μm.

15. The packaging film of claim 13, having a total machine direction and transversal direction Young's modulus of 350 to 750 kgf/mm$^2$, an initial tensile strength of 10 kgf/mm$^2$ or higher, a rate of weight loss of 0.01 to 3.0 wt % upon treatment for 1 hr in a 100° C. hot wind oven, a haze of 3% or less, and a light transmittance of 85% or higher.

* * * * *